Nov. 24, 1970 G. SCHMIDT 3,541,793
LIQUID FUELED ROCKET ENGINE SYSTEM
Filed March 12, 1968
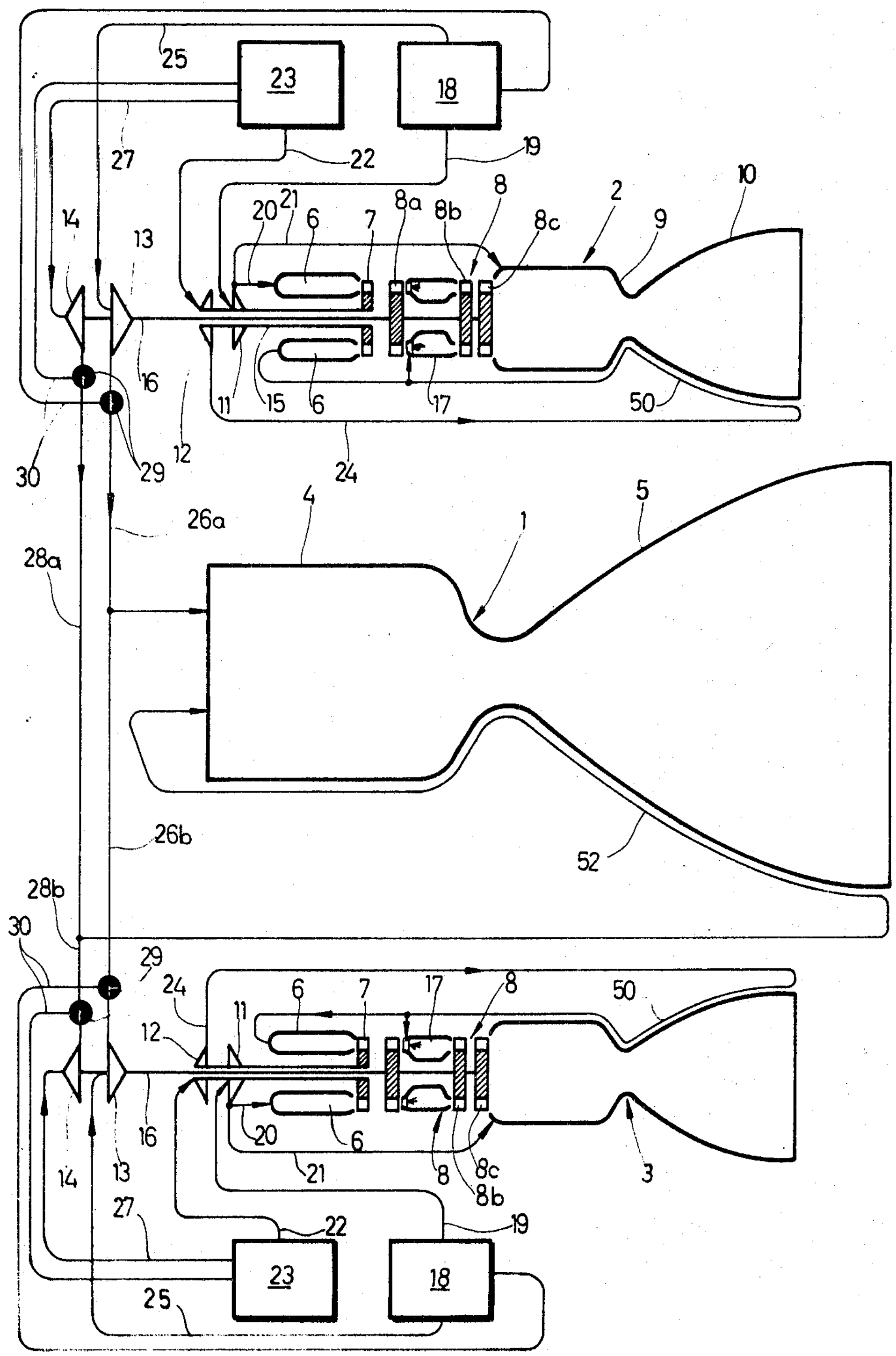
INVENTOR
Günther Schmidt
by McGlew and Toren
ATTORNEYS

United States Patent Office 3,541,793 Patented Nov. 24, 1970

3,541,793
LIQUID FUELED ROCKET ENGINE SYSTEM
Günther Schmidt, Ottobrunn-Riemerling, Germany, assignor to Bolkow Gesellschaft mit beschrankter Haftung, Munich, Germany
Filed Mar. 12, 1968, Ser. No. 712,487
Claims priority, application Germany, Apr. 5, 1967, B 91,917
Int. Cl. F02k *9/06*
U.S. Cl. 60—204 10 Claims

ABSTRACT OF THE DISCLOSURE

A liquid fueled rocket engine system comprises at least one high-power thrust unit having a combustion chamber and thrust nozzle for the production of a major part of the thrust and at least one main current-rocket engine having a pre-combustion chamber and one or more auxiliary turbines driven by gases from the pre-combustion chamber for driving pumps for delivering its own propellants or fuel components and the fuel components of the high-power thrust unit, the main current rocket engine or engines producing a smaller portion of the total thrust. The main current-rocket engines are characterized by an arrangement of two concentric shafts including a central shaft and a hollow shaft therearound. The shafts are driven independently of each other by mechanically separated single or multi-stage turbines. The pumps for delivering the fuel components for the main current-rocket engine are associated with the hollow shaft which is driven by a single stage turbine and the pumps for delivering the fuel components of the high-power thrust unit are associated with the central shaft which is driven by a multistage turbine.

The invention also relates to a method of operating a rocket engine system which comprises starting and accelerating first the main current-rocket engine with the high-power thrust engine pumps which are driven by such engines being oriented in a short circuit operation, and, after full operation of the main current-rocket engines has been achieved, connecting the pumps to supply the fuel components to the high-power thrust engine and igniting the components in the combustion chamber thereof.

SUMMARY OF THE INVENTION

This invention relates in general to the construction of a liquid fuel rocket engine system and to a method of operating the thrust engines of such a system and in particular, to a new and useful rocket engine system including at least one main thrust or high-power thrust unit and one or more smaller main current rocket engines which drive pumps for the smaller main current-rocket engines and also for the main thrust unit, and to a method for operating the units of the system.

Liquid fueled rocket engines with maximum thrust have been built up to the present time as induced current engines. A disadvantage of this type of engine and which is inherent in the system of the engine is that the entire portion of the fuel components is not used for the generation of thrust but a part of the fuel components is burned in an auxiliary combustion chamber and used for driving auxiliary equipment for the delivery of the fuel. The residual energy remaining in these gases after they pass through an auxiliary turbine is not used for the production of thrust in the rocket thrust nozzle, and therefore a loss is incurred which induces the specific impulse related to the total amount of fuel carried along.

The above-mentioned disadvantage does not incur in the liquid fuel rocket engines of the main current type having a pre-combustion chamber, a series connected auxiliary turbine for driving the fuel pumps, and a main combustion chamber connected in series to the pre-combustion chamber. With such a combustion system, the entire fuel volume is put through the main combustion chamber after the total amount of oxygen and a part of the fuel, or vice versa, has been burned at a relatively low temperature, either with a high oxygen or a high fuel content. Subsequently, this partially burned propellant is then expanded in the auxiliary turbine and then completely burned in the main combustion chamber. Apart from this advantage, however, there are problems in the liquid fuel rocket engine construction of the main current type which is inherent in the system and which make it difficult to achieve very great thrusts.

In accordance with the present invention, a rocket engine of high thrust and favorable operating conditions is provided in a system in which the fuel is fully utilized for the generation of thrust. This system combines at least one high-power thrust unit having its main combustion chamber and thrust nozzle for the generation of a major portion of the thrust of a predetermined total thrust. At least one current rocket engine having a pre-combustion chamber and one or more series-connected turbines, as well as a main combustion chamber and a thrust nozzle, is provided for generating the smaller thrust portion of the total thrust and also for the driving power for delivering the fuel components in the entire system.

In a still further development of the invention it is suggested that the pumps which are driven by each main current rocket engine be separately mounted on two shafts arranged concentrically to each other and be separately employed respectively for delivering its own fuel components and the fuel components of the high-power thrust unit. For this purpose a central solid shaft and a hollow surrounding shaft are employed which are independently driven by mechanically separated single or multi-stage turbines. The pumps for delivering the fuel components for the current rocket engine for preferably associated with the hollow shaft and are driven by a single stage turbine which is arranged immediately behind a pre-combustion chamber of the main current rocket engine. The pumps for delivering the fuel components for the high-power thrust unit are associated with the central solid shaft and they are driven by a multi-stage turbine. Such an arrangement permits a favorable individual speed determination and power distribution for the pumps delivering the fuel for the main current rocket engine and permit the satisfactory high efficiency operation of the pumps for delivering fuel components to the high-power thrust unit, which require a relatively greater output; but which, because of their greater dimensions, must run at lower speeds and have a lower feed pressure.

In order to increase the power of the propulsion unit, it is possible, according to the invention, to provide at least one intermediate stage of the first turbine of a multi-stage turbine arrangement with at least one intermediate precombustion chamber or heater between the turbine stages.

With the inventive system, an impulse loss which appears in induced current engines is inherent in such systems is avoided by not utilizing a part of the energy contained in the fuel portion which is provided for driving the fuel delivery pumps so that inversely an effective thrust gain is achieved.

Another advantage over known induced current engines is the fuel savings achieved during the start of the rocket engine of high thrust. This starting procedure usually takes from about 3–5 seconds with high-power liquid fueled rocket engines. With the method of the invention, the relatively small main current rocket engines are started first and the pumps for the high thrust engine are set to operate without load by circulating the liquid through a short circuit. At this stage of the operating start-up, the operating conditions of the propulsion unit can be checked again and the pump pressures for the thrust unit can be tuned up for those values which the high-power thrust unit requires for optimum operation. Thereafter, the connecting valves may be opened to connect the fuel to the high-power thrust unit which is started. In this manner the high thrust unit achieves its full nominal thrust within a very short time, only a few tenths of a second, because the thrust unit need not be accelerated from the operating point zero by itself. An independent acceleration, which takes from 3–5 seconds, involves great fuel losses in an engine of very high power, due to the poor efficiency which occurs during the starting period. Even if the main current engine also requires a few seconds for the starting process and the start is also effected with a lower efficiency, the fuel loss is relatively smaller. Thus, substantial fuel savings can be achieved with the system of the present invention.

A further advantage of the engine system according to the invention is that re-ignition of the main thrust engine is facilitated and a sort of idle run operation of the engine under favorable conditions is possible. For this purpose it is only necessary to bring the valves arranged in the fuel supply lines for the high-power thrust unit into a locking position. The main current engines may be easily regulated and throttled to further reduce the throughput, if desired.

In order to avoid any pitching movements about any transverse axes of the missile in which a propulsion system according to the invention is installed, it is expedient and advisable to provide two or more main current rocket engines on a common pitch circle around the high-power thrust unit so that the resulting thrust vector always extends through the center of gravity of the missile.

Accordingly, it is an object of the invention to provide an improved system of liquid fuel rocket engine which includes a high-power thrust engine for the production of a major part of the thrust and at least one main current rocket engine constructed to drive auxiliary pump units for supplying the fuel both to the main current engine and to the high thrust engine.

A further object of the invention is to provide a rocket engine system which includes a high-power thrust engine and at least one auxiliary main current engine having a pre-combustion chamber arranged to dischage products of combustion through one or more turbine elements and into the main combustion chamber, thereof, and wherein the turbine elements are mounted on separate, preferably concentrically arranged shafts for driving separate fuel component pumps, both for the main current engines for the high-power thrust engines.

A further object of the invention is to provide a method of operating a rocket engine system including one main high-power thrust engine and at least one additional auxiliary main current engine having a turbine driven thereby for driving fuel component pumps for each of said engines, comprising starting the main current engines and acceleating them to drive the pumps for delivering fuel components to itself and for driving the pumps for delivering the fuel components to the high-power thrust engine but connecting the pumps for short-circuit no-load operation, and thereafter, after the main current engines have been brought up to full operation, supplying the fuel components to the high-power thrust engine and igniting it.

A further object of the invention is to provide a rocket system which is simple in design, rugged in construction and economical to manufacture.

The various features of novelty which characterize the invention are pointed out with particularity in the claims annexed to and forming a part of this specification. For a better understanding of the invention, its operating advantages and specific objects attained by is use, reference should be had to the accompanying drawings and descriptive matter in which there is illustrated and described a preferred embodiment of the invention.

BRIEF DESCRIPTION OF THE DRAWING

The only figue of the drawing is a schematic diagram of a rocket system constructed in accordance with the invention.

GENERAL DESCRIPTION OF THE PREFERRED EMBODIMENT

Referring to the drawing in particular, the invention embodied therein comprises a main or high-power thrust unit or engine generally designated 1 and two main current or auxiliary rocket engines 2 and 3. The high-power thrust unit 1 consists, for example, substantially of a combustion chamber 4 and a thrust nozzle 5.

In accordance with the invention, the main current rocket engines 2 and 3, each include at least one pre-combustion chamber 6 (two of which 6, 6 are indicated for each engine) arranged to discharge gaseous products of combustion to drive respective stages of turbines 7 and 8 and an intermediate combustion chamber or auxiliary heater 15 arranged to discharge gaseous products of combustion to drive two stages of the turbine 8.

The front turbine 7 (in respect to the direction of fuel component and gas flow) is a single stage turbine and it is secured to a hollow outer shaft 15. The rear turbine 8 is a multi-stage turbine having stages **8*a*, 8*b* and 8*c*, and it is arranged between the main combustion chamber 9 and the pre-combustion chamber 17. The main combustion chamber 9 leads to a nozzle discharge section 10** for the discharge of thrust gases to generate a portion of the total thrust.

In accordance with a feature of the invention, the inner solid shaft 16 carries the turbine wheels **8*a* and 8*b* and 8*c* and fuel delivery pumps 13 and 14. The hollow shaft 16 carries fuel delivery pumps 11 and 12 and turbine 7. The pre-combustion chamber 17 is arranged to supply heat and/or energy to the fuel gases which are of relatively low temperature and which have been generated in the precombustion chamber 6 and delivered through the turbine elements 7 and 8*a*. This insures that the driving energy for these gases is sufficiently increased to drive the following stages 8*a* and 8*c***.

Pump 11 delivers liquid oxygen from a suction line 19 and a storage tank 18 to a pressure line 20 connected to the pre-combustion chambers 6 of each unit 2 and 3 and also to a pressure line 21 which connects to the main combustion chamber 9 of each unit 2 and 3. The pump 12 delivers a liquid fuel such as hydrogen from a storage tank 23 through a suction line 22 and into a pressure line 24 which is connected to circulate liquid through cooling passages 50 and then into the pre-combustion chamber 6.

Pump 13 of each of the engines 2 and 3 delivers a fuel component from the tank 18, and through suction line 25 to respective pressure line **62*a* or 26*b* to the main combustion chamber 4 of the high thrust engine 1. Pump 14 takes suction at the tank 23 through suction line 27 and delivers it through a respective pressure line 28*a* or 28*b* to the combustion chamber 4 of the high thrust unit after first directing it through cooling wall passages 52. Two way valves 29 are arranged in each of the pressure lines 26*a* and 26*b* and 28*a* and 28*b*. From the pressure side of pumps 13 and 14 lead short circuit lines 30 which may be connected by the two-way valves 29 to lead the pump fuel back to the storage tanks 18 and 23**, respectively.

The starting of the propulsion system is effected by first starting the main current rocket engines 2 and 3. The valves 29 are switched so that the fuel pumps 13 and 14 operate in the short circuit operation. After the main current rocket engines 2 and 3 have attained their operating speed, the valves 29 are reversed and the combustion chamber of the high-power thrust unit 1 is supplied with its fuel components. At the same time, the combustion chamber 4 is ignited.

In the idle run operation of the propulsion unit where only the main rocket engines 2 and 3 are running, the valves 29 are arranged in the blocking position. The idle run operation insures that the thrust unit 1 and the overall propulsion system may achieve its full capacity as rapidly as possible.

While a specific embodiment of the invention has been shown and described in detail to illustrate the application of the inventive principles, it will be understood that the invention may be embodied otherwise without departing from such principles.

What is claimed is:

1. A liquid fuel rocket system comprising a high-power thrust engine having a main combustion chamber and a discharge nozzle for discharging high thrust gases, at least one main current-rocket engine having a pre-combustion chamber and a main combustion chamber with a discharge nozzle for discharging thrust gases, turbine means driven by gases from said pre-combustion chamber, first propellant pump means connected to said turbine means and driven thereby for supplying propellant to said high-power thrust engine, and second propellant pump means connected to said turbine means and driven by said turbine means for supplying fuel components to said main current rocket engine, said first and second pump means each comprising two separate fuel component pumps, said turbine means comprising a first turbine having a first shaft connected to said first pump means and a second turbine having a concentric hollow second shaft surrounding said first shaft connected to said second fuel pump means, said first turbine being a multi-stage turbine.

2. A liquid fuel rocket system comprising a high-power thrust engine having a main combustion chamber and a discharge nozzle for discharging high thrust gases, at least one main current-rocket engine having a pre-combustion chamber and a main combustion chamber with a discharge nozzle for discharging thrust gases, turbine means driven by gases from said pre-combustion chamber, first propellant pump means connected to said turbine means and driven thereby for supplying propellant to said high-power thrust engine, and second propellant pump means connected to said turbine means and driven by said turbine means for supplying fuel components to said main current rocket engine, said turbine means comprising first and second turbines, said first turbine having a first central shaft, said second turbine having a second shaft concentrically arranged with respect to said first shaft and surrounding said first shaft, said first and second turbines and their associated first and second shafts being separately and independently driven.

3. A liquid fuel rocket system according to claim 2, wherein said first pump means includes first and second high thrust engine fuel component pumps for delivering respective separate fuel components to said high thrust unit, said second fuel pump means comprising first and second main current rocket engine pumps for delivering respective separate fuel components to said main current rocket engine and which are connected to said hollow shaft and rotatable therewith.

4. A liquid fuel rocket system according to claim 3, wherein said first turbine is a multi-stage turbine and including a second pre-combustion chamber disposed between stages of said first and second turbine.

5. A liquid fuel rocket system comprising a high-power thrust unit having a main combustion chamber and a nozzle section for discharging thrust gases from said main combustion chamber, at least one main current-rocket engine having a pre-combustion chamber and a main combustion chamber with a discharge for discharging thrust gases, first and second relatively-rotatable auxiliary turbines disposed between said pre-combustion chamber and said main combustion chamber in a position to receive gases in series from the pre-combustion chamber and to discharge the gases into said main combustion chamber after rotating said first and second turbines, first fuel pump means connected to said first turbine and being rotatable thereby to supply fuel components to said high-power thrust unit and second fuel pump means connected to said second turbine and rotatable thereby to supply fuel components to said main current-rocket engine.

6. A liquid fuel rocket system according to claim 5, wherein said first pump means includes means for short-circuiting fuel components discharged from said first pump means and switching means for switching from said short circuiting means to connect directly to said main high thrust unit.

7. A method of operating a liquid fueled rocket system including a highpower thrust unit for developing the maximum portion of the thrust and at least one main current rocket engine associated with said high-power thrust unit and having means for separately directing thrust gases to drive an auxiliary turbine for operating one or more main current pumps which are connected to supply fuel components to the main current rocket engine and for also operating one or more high-power thrust unit pumps which are connectable to supply fuel components to said high-power thrust unit and which may also be connected to discharge to a return line leading back to a storage tank, comprising operating the main current-rocket engine to maintain an idle run operation and to drive the turbine to rotate one or more of the main current pumps so that they deliver fuel components to said main current-rocket engine and also to operate one or more high-power thrust unit pumps so that they deliver to the return line under low load.

8. A method according to claim 7, wherein the main current rocket engine is started and accelerated with the high-thrust unit pumps operating to direct the fuel to a return line, and, after the main current-rocket engines are brought up to full operation, connecting the high-thrust unit pumps to discontinue directing fuel to the return line and to supply fuel components to the high-power thrust unit, and thereafter igniting the high-power thrust unit.

9. A liquid fuel rocket system comprising a high-power thrust unit having a main combustion chamber and a nozzle section for discharging thrust gases from said main combustion chamber, at least one main current-rocket engine having a pre-combustion chamber and a main combustion chamber with a discharge for discharging thrust gases, first and second auxiliary turbines disposed between said pre-combustion chamber and said main combustion chamber in a position to receive gases in series from the pre-combustion chamber and to discharge the gases into said main combustion chamber after rotating said first turbine and being rotatable thereby to supply fuel components to said high-power thrust unit and second fuel pump connect to said second turbine and rotatable thereby to supply fuel components to said main current-rocket engine, said first turbine being a multi-stage turbine and including a second pre-combustion chamber disposed between stages of first and second turbines.

10. A liquid fuel rocket system comprising a high-power thrust unit having a main combustion chamber and a nozzle section for discharging thrust gases from said main combustion chamber, at least one main current rocket engine having a pre-combustion chamber and a main combustion chamber with a discharge for discharging thrust gases, first and second auxiliary turbines disposed between said pre-combustion chamber and said main combustion chamber in a position to receive gases in series from the pre-combustion chamber and to discharge the gases into said main combustion chamber after rotating said first and second turbines, first fuel pump means connected to said first turbine and being rotatable thereby to supply fuel components to said high-power thrust unit, and second fuel pump means connected to said second turbine and rotatable thereby to supply fuel components to said main current-rocket engine, said first turbine including a central shaft, said second turbine comprising a hollow shaft surrounding said first shaft.

References Cited

UNITED STATES PATENTS

| | | | |
|---|---|---|---|
| 2,531,761 | 11/1950 | Zucrow | 60—225 |
| 2,857,740 | 10/1958 | Hall | 60—225 |
| 3,413,810 | 12/1968 | Kauffmann | 60—261 |

FOREIGN PATENTS

| | | |
|---|---|---|
| 736,752 | 9/1955 | Great Britain. |

CARLTON R. CROYLE, Primary Examiner

D. HART, Assistant Examiner

U.S. Cl. X.R.

60—225